(12) United States Patent
Okuno et al.

(10) Patent No.: US 7,316,806 B2
(45) Date of Patent: Jan. 8, 2008

(54) MODIFYING CATALYST FOR PARTIAL OXIDATION AND METHOD FOR MODIFICATION

(75) Inventors: Masaaki Okuno, Himeji (JP); Akiyoshi Nakajima, Akashi (JP)

(73) Assignee: Nippon Shokubai Co., Ltd., Osaka (JP)

( * ) Notice: Subject to any disclaimer, the term of this patent is extended or adjusted under 35 U.S.C. 154(b) by 267 days.

(21) Appl. No.: 10/971,743

(22) Filed: Oct. 22, 2004

(65) Prior Publication Data

US 2005/0112057 A1   May 26, 2005

(30) Foreign Application Priority Data

Oct. 29, 2003   (JP)   ............. 2003-369019

(51) Int. Cl.
C01B 3/26 (2006.01)
C01B 17/16 (2006.01)
C01B 31/20 (2006.01)
B01J 23/00 (2006.01)
B01J 23/42 (2006.01)

(52) U.S. Cl. ............ 423/651; 502/304; 502/326; 502/327; 502/332; 502/334; 502/339; 502/349; 502/355; 502/415; 502/439; 502/527.11; 502/527.12; 502/527.19

(58) Field of Classification Search ........... 502/326, 502/327, 332, 334, 339, 439, 407, 415, 349, 502/350, 527.11, 527.12, 527.13, 527.19; 423/651, 355

See application file for complete search history.

(56) References Cited

U.S. PATENT DOCUMENTS

| | | | |
|---|---|---|---|
| 4,294,726 A * | 10/1981 | Bozon et al. ............... | 502/304 |
| 4,927,857 A | 5/1990 | McShea, III et al. ....... | 518/703 |
| 5,045,521 A * | 9/1991 | Lox et al. ................... | 502/304 |
| 5,720,901 A | 2/1998 | De Jong et al. ............ | 252/373 |
| 6,150,288 A * | 11/2000 | Suzuki et al. ............... | 501/105 |
| 6,180,075 B1 * | 1/2001 | Lindner et al. ........... | 423/213.2 |
| 6,254,807 B1 | 7/2001 | Schmidt et al. ............ | 252/373 |
| 6,294,140 B1 * | 9/2001 | Mussmann et al. ....... | 423/213.5 |
| 6,306,794 B1 * | 10/2001 | Suzuki et al. ............... | 502/304 |
| 6,348,430 B1 * | 2/2002 | Lindner et al. ............ | 502/304 |
| 6,350,421 B1 * | 2/2002 | Strehlau et al. .......... | 423/213.2 |
| 6,403,526 B1 * | 6/2002 | Lussier et al. .............. | 502/439 |
| 6,524,992 B2 * | 2/2003 | Mussmann et al. ........ | 502/304 |
| 6,585,944 B1 * | 7/2003 | Nunan et al. ............ | 423/239.1 |
| 6,752,969 B1 * | 6/2004 | Nishimura et al. ......... | 422/180 |
| 6,764,665 B2 * | 7/2004 | Deeba et al. ............ | 423/239.1 |
| 6,858,193 B2 * | 2/2005 | Ruwisch et al. ......... | 423/213.5 |
| 6,875,725 B2 * | 4/2005 | Lindner et al. ............ | 502/328 |
| 6,926,875 B2 * | 8/2005 | Hatanaka et al. ........ | 423/239.1 |
| 2002/0134706 A1 | 9/2002 | Keller et al. ................ | 208/250 |

(Continued)

FOREIGN PATENT DOCUMENTS

EP    0 112 613 B1    3/1991

(Continued)

*Primary Examiner*—Cam N. Nguyen
(74) *Attorney, Agent, or Firm*—Occhiuti Rohlicek & Tsao LLP (57) ABSTRACT

A reforming catalyst for partial oxidation to reform hydrocarbon compound including a sulfur-containing compound includes platinum and rhodium. Even in reforming a hydrocarbon compound including a sulfur-containing compound such as, for example, a town gas, the catalyst effectively prevents poisoning and elongates catalyst life.

12 Claims, 1 Drawing Sheet

U.S. PATENT DOCUMENTS

2003/0103886 A1* 6/2003 Dou ........................ 423/239.1
2003/0125202 A1* 7/2003 Ruwisch et al. ............ 502/328
2003/0129123 A1   7/2003 Ramani et al. .......... 423/573.1
2003/0139290 A1* 7/2003 Jordan et al. ................ 502/344
2004/0048741 A1* 3/2004 Poulston et al. ............ 502/302
2004/0082470 A1* 4/2004 Gandhi et al. ............... 502/325
2004/0092395 A1* 5/2004 Hase et al. .................. 502/439
2005/0176580 A1* 8/2005 Osaka et al. ................ 502/339

FOREIGN PATENT DOCUMENTS

JP       2002-121006       4/2002

* cited by examiner

MODIFYING CATALYST FOR PARTIAL OXIDATION AND METHOD FOR MODIFICATION

BACKGROUND OF THE INVENTION

1. Field of the Invention

This invention relates to a reforming catalyst for partial oxidation of a hydrocarbon compound containing a sulfur compound and to a method for the reforming.

2. Description of the Related Art

The hydrogen-containing gas which mainly includes hydrogen and carbon monoxide is widely utilized as the raw material for reducing gas and also for various chemical products besides the production of hydrogen gas. Recently, the feasibility study of using this gas as the fuel for a fuel cell is now under way. The hydrogen-containing gas is obtained by the reforming of a hydrocarbon compound and the method of partial oxidation of hydrocarbon represented by the following formula is available for this method of reforming.

$$CH_4 + 1/2O_2 \rightarrow 2H_2 + CO$$

The method for partial oxidation of hydrocarbon consists in producing a hydrogen-containing gas by partially oxidizing the hydrocarbon with an oxygen-containing gas such as air in the presence of a catalyst. The preceding formula represents the reaction of partial oxidation using methane as the hydrocarbon.

For this reaction of reforming, methods which includes deriving hydrogen from methanol, LP gas, natural gas, gasoline, gas oil, and coal oil and putting the hydrogen to use have been available. From the infrastructural point of view, the town gas is thought to be one of the fuels that near the practical use. The town gas and the LP gas, however, contain sulfur components such as mercaptan and, when directly introduced, pose such problems as poisoning a reforming catalyst and a CO removing catalyst and suffering from degradation of performance.

As means to avoid these problems caused by sulfur components, various preventive measures have been proposed such as, for example, a method which includes having a desulfurizing device additionally disposed, using this device to remove the sulfur components, and subjecting the source gas emanating from the device to a process for partial oxidation. When such a preventive measure is adopted, the additionally disposed device results in incurring cost of installation and cost of maintenance and inevitably entails a new problem of boosting the cost of production.

In JP-2002-121006A, a catalyst having platinum supported on a zirconia type mixed oxide is proposed as a catalyst repressing degradation of catalysis by sulfur poisoning in the reaction of reforming a sulfur compound-containing hydrocarbon. JP-2002-121006A mentions that the reaction of partial oxidation has serious degradation of performance, and the inclusion of water and air in the source gas is necessary for securing durability to withstand the sulfur poisoning.

SUMMARY OF THE INVENTION

The reaction of reforming needs to be carried out at a high temperature and consequently imposes a problem of durability on the catalyst. Particularly, the source gas containing sulfur causes the shortening of the catalyst life.

This life of the catalyst, depends as well on the temperature at the reforming, can be elongated by proceeding the efficiently reforming at a low temperature.

This invention has been developed in the light of the state of affairs mentioned above. It is an object of the present invention to provide a reforming catalyst for the partial oxidation to reform a hydrocarbon compound containing sulfur component, which represses deterioration of catalytic activity, excels in resistance to poisoning, and enjoys lasting durability and a method for effecting the reforming.

The present inventors have made a detailed study on the reaction of reforming a hydrocarbon compound containing a sulfur-containing compound and have consequently found that a catalyst containing platinum and rhodium enables a catalyst layer to restrain rise of temperature and abate development of thermal load and, as a result, exalt durability and enjoy an elongation of catalyst life. This invention has been perfected on the basis of this knowledge.

By the reforming catalyst of this invention for partial oxidation, contemplated, even when the source gas contains a sulfur compound, the reaction of reforming can be carried out at a low temperature and the poisoning produced by the sulfur compound can be repressed. The reforming catalyst of this invention for partial oxidation, therefore, is suitable for incorporation in a fuel cell such as a solid oxide fuel cell or a polymer electrolyte type fuel cell which is expected to offer lasting service.

DESCRIPTION OF THE PREFERRED EMBODIMENTS

In the first aspect of the present invention, a reforming catalyst for partial oxidation to reform hydrocarbon compound, including platinum and rhodium. Now, this invention will be described in detail below.

This invention has an indispensable requirement of containing platinum and rhodium in all platinum group elements, rhodium, ruthenium, osmium, and iridium. As demonstrated in the working examples cited herein below, this reforming catalyst enables the reaction of partial oxidation to proceed under a condition of significantly low the highest catalyst layer temperature than a catalyst formed solely of rhodium is used even the source gas contains a sulfur compound.

The mass ratio of platinum to rhodium (mass ratio of rhodium:platinum) is preferably in the range of 5:100 to 100:10, more preferably 5:100 to 100:50, and particularly preferably 5:100 to 100:100. If the platinum content falls short of the mass ratio of 100:10, the shortage will be at a disadvantage in lowering the highest catalyst layer temperature insufficiently and failing to effect exaltation of durability. Conversely, if the platinum content exceeds the mass ratio of 5:100, the overage will possibly fail to obtain proportionally sufficient effect with respect to the rise of cost due to the use of platinum.

This invention prefers the reforming catalyst thereof to contain cerium oxide in addition to the platinum and the rhodium. More preferably, the reforming catalyst contains cerium oxide and zirconium oxide and as well contains cerium oxide and zirconium oxide in the form of a cerium-zirconium mixed oxide. The content ratio of cerium oxide and zirconium oxide is in the range of 100:2 to 2:100 (mass ratio) as reduced to cerium oxide ($CeO_2$) and zirconium oxide ($ZrO_2$). When the content of cerium oxide is larger than that of zirconium oxide, the content ratio of cerium oxide and zirconium oxide is preferred to be in the range of 100:2 to 100:60 and more preferably in the range of 100:4 to 100:40. When the content of zirconium oxide is larger than that of cerium oxide, the content ratio of cerium oxide and zirconium oxide is preferably in the range of 2:100 to 100:100 and more preferably in the range of 10:100 to 60:100 and particularly preferably in the range of 20:100 to 40:100.

The fact that cerium and zirconium form an mixed oxide can be basically conformed by the absence of detection of the peak of the oxide of a smaller content in the X-ray diffraction analysis. When the cerium oxide ($CeO_2$): zirconium oxide ($ZrO_2$) (mass ratio) falls in the range of 100:50 to 50:100, depending on the condition of the preparation of the mixed oxide, however, the oxide of a smaller content may possibly show a broad peak of low crystallinity in the X-ray diffraction. This invention, therefore, uses the term "cerium-zirconium complex compound" in such a broad sense as to embrace an oxide in the form of an intimate mixture. By having the mass ratio of cerium oxide ($CeO_2$) and zirconium oxide ($ZrO_2$) adjusted in the range of 100:2 to 2:100 in the cerium-zirconium mixed oxide, it is made possible to obtain a reforming catalyst which possesses high activity and excellent durability and excels in the ability to decompose a hydrocarbon and in the capacity for partial oxidation. Though the reason for the manifestation of such good effects defies clear elucidation, it may be logically explained by a supposition that cerium oxide possesses an ability to storage oxygen and manifests an effect of varying the electronic state of an element of platinum group as an active component by releasing or entrapping oxygen and this effect is further enlarged in a cerium-zirconium mixed oxide having the cerium oxide ($CeO_2$) and zirconium oxide ($ZrO_2$) mass ratio in the range of 100:2 to 2:100.

The cerium-zirconium mixed oxide can be easily prepared, for example, in accordance with any of the following procedures.

(1) An aqueous cerium salt solution and an aqueous zirconium salt solution are mixed and then the resultant mixture is dried and calcinated.

(2) An aqueous cerium salt solution and an aqueous zirconium salt solution are mixed and then the resultant mixture is coprecipitated as by the use of an ammonium compound, dried, and calcinated.

(3) Cerium oxide and zirconium oxide are mixed and then the resultant mixture is subjected to a solid-phase reaction.

(4) Cerium oxide is impregnated with an aqueous zirconium salt solution and then the product of impregnation is dried and calcinated or zirconium oxide is impregnated with an aqueous cerium salt solution and then the product of impregnation is dried and calcinated.

(5) An aqueous cerium salt solution and an aqueous zirconium salt solution are made to impregnate a refractory inorganic oxide such as activated alumina and then the product of impregnation is dried and calcinated.

In this case, the raw material for cerium and the raw material for zirconium do not need to be particularly restricted. Various compounds are available as the raw materials. As concrete examples of the raw material for cerium, commercially available cerium oxide, cerium salt compounds such as cerium oxide sol, cerium nitrate, cerium chloride, cerium carbonate, and cerous acetate, and cerium oxide and cerium hydroxide prepared there from may be cited. As concrete examples of the raw material for zirconium, commercially available zirconium oxide, zirconium oxide sol, various halogenides such as and zirconium tetrachloride, partial hydrolyzates thereof, various oxyhalogenides such as zirconyl chloride (oxy zirconium chloride), various oxygen acid salts such as zirconyl sulfate, zirconium nitrate, and zirconyl nitrate, carbonates such as zirconium carbonate and zirconyl carbonate, various organic acid salts such as zirconium acetate, zirconyl acetate, and zirconyl oxalate, alkoxides of zirconium, and various complex salts may be cited.

The calcination in the procedures (1)-(5) mentioned above has to be carried out, for example, in the air at a temperature in the range of 300 to 800° C. and preferably in the range of 400 to 800° C. for a period in the approximate range of 0.5 to 3 hours. Consequently, a cerium-zirconium mixed oxide is obtained.

Platinum and rhodium are preferred to be supported on a refractory inorganic oxide. As concrete examples of the refractory inorganic oxide, activated alumina, zirconia, silica, titania, spinel, mullite, alumina-silica, and titania-silica may be cited. These refractory inorganic oxides may be used either singly or in the form of a combination of two or more members. Among other refractory inorganic oxides enumerated above, activated alumina is used particularly advantageously because it has a large BET specific surface area and offers a large contact surface with the reacting gas and is consequently enabled to exalt the reaction of partial oxidation and manifest resistance to a high-temperature heat. Further, the activated alumina, when made to carry thereon a platinum group element as specifically described herein after, is capable of retaining the characteristic properties of the platinum group element for a long time. The activated alumina is known in various types such as α-alumina, γ-alumina, δ-alumina, θ-alumina, and η-alumina, for example. Among other types of the activated alumina cited above, activated alumina having a specific surface area in the range of 25 to 250 $m^2/g$ is used particularly advantageously.

The activated alumina, a commercially available alumina powder is used. Alternatively, boehmite, alumina hydrate in the form of pseudo boehmite, and aluminum hydroxide which are transformed by calcination into activated alumina are also available. Otherwise, the activated alumina which is produced by adding the aqueous solution of such an aluminum salt as aluminum nitrate and an alkali together thereby forming the precipitate of a relevant hydroxide and drying and calcinating the precipitate may be used. The activated alumina produced by the sol-gel process which includes hydrolyzing such an alkoxide as aluminum isopropoxide thereby preparing alumina gel and drying and calcinating the alumina gel may be used.

As the zirconia, a commercially available zirconia powder may be used. Besides, various products of zirconia which are obtained by drying and calcinating zirconia sol, various halogenides such as zirconium tetrachloride and products of partial hydrolysis thereof, various oxyhalogenides such as zirconyl chloride (zirconium oxychloride), various oxygen acid salts such as zirconyl nitrate, carbonates such as zirconium carbonate and zirconyl carbonate, various organic acid salts such as zirconium acetate, zirconyl acetate, and zirconyl oxalate, alkoxides of zirconium, and various complex salts may be used. In this invention, the zirconia may be used as the zirconium oxide mentioned above and the zirconia may be used as a refractory organic oxide. In the conversion of the content of zirconia, when the zirconia is used as the carrier for carrying platinum and rhodium thereon, it is calculated as a refractory inorganic oxide.

Though this invention does not particularly restrict the mass ratio of cerium oxide to the refractory inorganic oxide (mass ratio of refractory inorganic oxide:cerium oxide), the mass ratio of refractory inorganic oxide:cerium oxide is preferably in the range of 100:15 to 100:60 and more preferably in the range of 100:20 to 100:40. The reason for the preference of this range is that even when the catalyst layer is exposed to a high temperature in the approximate range of 700 to 1000° C. and the source gas contains a sulfur component, it is enabled to deter deterioration of catalytic activity at elevated temperatures, exhibit satisfactory resistance to heat, and retain stable catalytic activity stably for a long time. This excellence of the catalyst is particularly prominent when the activated alumina is used as a refractory inorganic oxide. When cerium oxide is incorporated at a high concentration when platinum and rhodium are contained in the range mentioned above, it not only deters effectively thermal deterioration of catalytic activity but also functions effectively in deterring poisoning of a catalyst as with sulfur and inhibiting support of carbon and allowing a good catalytic activity to be retained stably for a long time.

When the reforming catalyst of this invention for use in partial oxidation contains a refractory inorganic oxide having platinum and rhodium supported thereon, the preferred embodiment for the exaltation of durability consists in having a considerable deal of the platinum and the rhodium supported in on a small amount of the refractory inorganic oxide. The total amount of the platinum and the rhodium supported on the refractory inorganic oxide (the proportion to the total amount of the refractory inorganic oxide and platinum group elements) is preferred to be in the range of 3 to 30 mass % and more preferably in the range of 5 to 20 mass %.

Further, in the completed catalyst, the average particle diameter of the refractory inorganic oxide (which is determined by the method of determination described below and will be referred to in this invention as "EPMA method average particle diameter") is preferred to be in the range of 1 to 20 μm and more preferably in the range of 1 to 10 μm.

(Method of Determination)

The coating layer of a given completed catalyst is photographed at 3,000 magnifications with an electron probe micro-analyzer (EPMA) at 30 randomly selected sites to obtain as X-ray image of a platinum group element. The particle diameters in the photograph are measured and the average particle diameter is computed based on the results of the measurement.

The reforming catalyst of this invention may further contain other rare earth elements than cerium. As regards the method for the addition of such rare earth elements, by having the rare earth element incorporated in the starting raw material to be used in any of the procedures (1)-(5) mentioned above, it is made possible to prepare easily a cerium-zirconium mixed oxide containing the rare earth elements.

This invention allows yet other component to be contained in the reforming catalyst. Base metals are such other components. As concrete examples of the base metal, such metals as Na, K, Cs, Ni, Co, Fe, Cr, Cu, V, Pr, Mg, Mo, W, Mn, Zn, Ga, Y, Ti, Ba Re, Bi, Nb, Ta, La, Ag, and Au which belong to Groups I, II, IIIB, IV, V, VIB, VIIB, and VIII in the Periodic Table of the Elements may be cited. Such a base metal, on existing in the catalyst in the form of metal, metal oxide, or solid solution with a noble metal element, manifests such effects as promoting the catalytic activity of the noble metal, contributing to the stabilization of the activity, and exalting the selectivity for hydrogen.

(Shape of Catalyst)

The shape of the catalyst of this invention may be arbitrarily selected from various shapes including the shape which results from supporting the components mentioned above on a carrier in the form of spheres, granules, pellets, and monolith (discrete) segments. The catalyst in this shape may be formed by the known method.

The monolith carrier excels the other carriers in low pressure drop ability and resistance to a powdering and particularly facilitates the handling as for packing the catalyst in a reforming device. As concrete examples of the material for the monolith carrier, oxides and silicates such as cordierite, mullite, α-alumina, zirconia, titania, aluminasilicate, and magnesium silicate; and heat-resistant alloys such as stainless steel and Fe—Cr—Al alloy may be cited. These materials may be used as the monolith carrier either singly or in the form of a combination of two or more members. The carrier that is mainly formed of the cordierite, a material possessing particularly high heat-resistant strength and excelling in resistance to thermal shock than other materials, can be recommended as the most advantageous carrier. The monolith carrier has numerous through holes formed therein as directly paralleled. The shape of the holes may be arbitrarily shapes such as a circle, a triangle, a tetragon, a hexagon. The size of these holes does not need to be particularly restricted.

The cell density of the carrier does not need to be particularly restricted. For the purpose of heightening the efficiency of contact of the cells wit the reaction gas, it is recommended to set the cell density preferably in the range of 150 to 600 cells/square inch and more preferably in the range of 250 to 600 cells/square inch. If the cell density is unduly large, the overage will possibly result in inducing clogging. Conversely, if the cell density is unduly small, the shortage will possibly result in obstructing acquisition of a sufficient catalytic efficiency.

The amount of the component to be supported on this monolithic carrier does not need to be particularly restricted. It is generally such that the total amount of platinum and rhodium may fall preferably in the range of 0.1 to 15 g and more preferably in the range of 0.3 to 10 g per 1 L of the monolith carrier. If the total amount falls short of 0.1 g, the shortage will possibly obstruct acquisition of a sufficient catalytic activity. Conversely, if the total amount exceeds 15 g, the overage will fail to bring a proportional addition to the effect of the use of the platinum group element.

(Method for Preparation of Catalyst)

The partial reforming catalyst of this invention does not need to restrict the method to be adopted for its preparation but is only required to contain platinum and rhodium. The support of platinum and rhodium, an mixed oxide, and a refractory inorganic oxide on the monolith carrier proves advantageous for the sake of ensuring ease of introduction of the catalyst in the reforming device. Thus, a method of preparation which is adopted favorably for this support will be described below.

(Method 1)

A solution, generally an aqueous solution, containing platinum and rhodium, a cerium-zirconium mixed oxide, and a refractory inorganic oxide are supplied to a pulverizing device such as a ball mill, grind is performed therein in the wet state to prepare a slurry. A monolith carrier is exposed to the slurry and the resultant impregnated carrier is dried and calcinated.

As the source for platinum, various compounds of platinum element may be used. As concrete examples of the platinum compound, $PtCl_4$, $H_2PtCl_6$, $Pt(NH_3)_4Cl_2$, $(NH_4)_2PtCl_2$, $H_2PtBr_6$, $NH_4[Pt(C_2H_4)Cl_3]$, $Pt(NH_3)_4(OH)_2$, and Pt(NH$_3$)$_2$(NO$_2$)$_2$ may be cited. As concrete examples of the rhodium compound, (NH$_4$)$_2$RhCl$_6$, RH(NH)$_5$Cl$_3$, RhCl$_3$, and Rh(NO$_3$)$_3$ may be cited.

In the preparation of the slurry, acids such as hydrochloric acid, sulfuric acid, nitric acid, acetic acid, and oxalic acid, basic compounds such as ammonia and tetraammonium hydroxide, and macromolecular compounds such as polyacrylic acid and polyvinyl alcohol may be added as occasion demands for the sake of adjusting the viscosity of the slurry and enhancing the stability thereof.

The method for contacting the monolith carrier with the slurry does not need to be particularly restricted. Such methods as impregnation, immersion, wet adsorption, spraying, and coating are available for establishing this contact. Among these methods mentioned above, the method of impregnation proves particularly advantageous. Further, the conditions for retaining this contact are suitably varied. The operation of this contact may be implemented, for example, under an atmospheric pressure or under a reduced pressure. The temperature during the contact does not need to be particularly restricted. The contact, when necessary, may be carried out under application of heat. This contact is properly performed at a temperature in the range of normal room temperature to the neighborhood of 90° C. When the monolith carrier is immersed in the slurry, the catalytic components can be uniformly supported on the monolith carrier. Thus, this method of immersion can be advantageously used. After the immersion, the wet monolith carrier may be treated as by a method of air blow to expel the excess slurry adhering thereto and then dried. For this invention, the support of platinum and rhodium (which may be referred to occasionally as "platinum group elements" herein below) on a refractory inorganic oxide may prove advantageous. In this case, the two platinum group elements may be simultaneously supported on the refractory inorganic oxide by preparing a solution containing a platinum source and a rhodium source and exposing the refractory inorganic oxide to the solution. Otherwise, solutions individually containing two platinum group elements may be prepared separately and the refractory inorganic oxide may be exposed sequentially to the two solutions.

The method of drying the wet carrier does not need to be particularly restricted. Any method which is capable of depriving the slurry of excess water at all can be arbitrarily adopted. The drying may be effected at normal room temperature or at an elevated temperature. When the wet carrier is dried and then calcinated, the catalytic component can be fixed firmly on the monolith carrier. The calcination is required to be carried out, for example, in the air or in a reducing atmosphere at a temperature in the range of 400 to 800° C. When the catalytic component can not be supported in a necessary amount by one round of the operation, the aforementioned procedure of immersion-drying-calcination may be repeated.

(Method 2)

The platinum group elements are supported on part or the whole of a refractory inorganic oxide. The refractory inorganic oxide having the platinum group elements consequently supported thereon is supplied together either with remainder of the refractory inorganic oxide having no platinum group element supported thereon and a cerium-zirconium mixed oxide or with the cerium-zirconium mixed oxide to a pulverizing device such as a ball mill and wet pulverized therein to prepare a slurry. The monolith carrier is exposed to this slurry and the wet carrier consequently formed is dried and calcinated.

For the purpose of supporting the platinum group elements on the refractory inorganic oxide, it suffices to expose the refractory inorganic oxide to a solution of the platinum group elements and then drying and calcinating the wet oxide by following the procedure described in Method 1 above. Now, this method will be described specifically below by citing a case of using activated alumina as the refractory inorganic oxide by way of illustration. The activated alumina is exposed to a solution, generally an aqueous solution, having platinum group element sources dissolved therein in order that the catalyst possesses desired amount of the platinum group elements and the dry activated alumina consequently obtained is dried and calcinated.

With an object of exalting the solubility of the platinum group element sources and adjusting the pH value of the produced solution, the aqueous solution may further be added therein inorganic acids such as hydrochloric acid, sulfuric acid, and nitric and and organic acids such as acetic acid and oxalic acid.

The activated alumina having the platinum group elements supported thereon is obtained by exposing the activated alumina to the aqueous solution containing platinum and rhodium, drying, and then calcinating the wet activated alumina consequently formed in the air or in a reducing atmosphere at a temperature in the range of 300 to 600° C., for example, for a period in the range of 2 to 6 hours.

The subsequent steps of preparing the slurry, establishing contact of the slurry with the monolith carrier, and calcinating the dried monolith carrier may be carried out by following the procedure described in Method 1 above.

In this invention, the refractory inorganic oxide which has platinum and rhodium supported thereon is preferred to have an EPMA method average particle diameter in the range of 1 to 20 μm.

The refractory inorganic oxide which has platinum and rhodium supported thereon may undergo cohesion and gain in particle diameter, depending on the conditions of production. The particle diameter, however, can be adjusted in the range of 1 to 20 μm, for example, by adjusting the duration of pulverization at the step of wet pulverization during the preparation of slurry.

(Method 3)

Platinum and rhodium are supported on part or the whole of a cerium-zirconium mixed oxide. The cerium-zirconium mixed oxide having platinum and rhodium consequently supported thereon is supplied together with either the remainder of cerium-zirconium mixed oxide having no platinum group element supported thereon and a refractory inorganic oxide or the refractory inorganic oxide to a pulverizing device such as a ball mill and wet pulverized therein to prepare a slurry. The monolith carrier is exposed to this slurry and then the wet monolith carrier consequently obtained is dried and calcinated. Method 3 can be carried out by following the procedure described in Method 2 above.

When other component than the component mentioned above is to be incorporated, salt compounds or oxides of relevant metal elements may be used as mixed with the slurry mentioned above or as fixed in advance in a cerium-zirconium mixed oxide or a refractory inorganic oxide.

For this fixation, the same procedure as used in supporting the platinum group element on the refractory inorganic oxide mentioned above may be adopted.

Now, the method of effecting the reforming by the use of the reforming catalyst for partial oxidation described above will be explained.

The reforming catalyst of this invention is suitable for the reaction of partial oxidation of a hydrocarbon compound containing a sulfur-containing compound.

The hydrocarbon compounds include light hydrocarbons such as methane, propane, butane, heptane, and hexane and petroleum hydrocarbons such as gasoline, kerosene, and naphtha, for example. When the source gas contains a sulfur component which is fated to poison the catalyst, the reforming reaction may be carried out at a low temperature without requiring removal of the sulfur component. The town gas can be used advantageously because it is copiously available as a resource and is easily procurable as well.

The town gas is generally stored in a gas tank and then supplied under a reduced pressure via a pipe to the site of use. The town gas is formed mainly of methane. The methane content of the town gas is preferably not less than 70 wt % and more preferably not less than 80 wt %.

The sulfur compounds which are contained in the source gas include mercaptan, thiophene, and sulfide, for example, which are added as odorants to the town gas. By the method of this invention, even when the source gas contains a sulfur component destined to poison the catalyst, the reaction of reforming can be carried out at a low temperature without requiring removal of the sulfur component. The catalyst having rhodium alone supported thereon indeed manifests a good performance when it has been deprived in advance of the sulfur compound by the use of a desulfurizer. When the desulfurizer suffers the capacity thereof to be degraded by aging or by a certain trouble and the sulfur compound is consequently suffered to escape removal and enter the catalyst, however, this catalyst has a possibility of succumbing to degradation of performance and durability. In contrast, the bad influence on the performance and durability of the catalyst of the present invention is quite limited even if the desulfurizing ability decreased due to aging or some trouble.

For the reforming of this invention, the source gas is generally obtained by mixing a hydrocarbon-containing gas and an oxygen-containing gas. Generally, air is used as the oxygen-containing gas. The ratio of the hydrocarbon-containing gas and the oxygen-containing gas is preferred to be such that the number of moles of the oxygen molecule per one carbon atom (oxygen molecule/carbon atom ratio) may fall in the range of 0.45 to 0.75 and preferably in the range of 0.48 to 0.6 for the sake of the efficient partial oxidation of hydrocarbon.

The pressure is not higher than the normal pressure and is properly fixed at a level of not more than 5 MPa·G and preferably not more than 3 MPa·G. The space velocity (SV) of the gas is properly fixed in the range of 3,000 to 500,000 $H^{-1}$ and preferably in the range of 10,000 to 300,000 $H^{-1}$. As respects the temperature, for the purpose of efficiently performing the reaction of reforming while preventing the catalyst from succumbing to thermal deterioration, it is commendable to set the temperature of the catalyst layer in the range of 600 to 1,000° C. and preferably in the range of 700 to 950° C.

Incidentally, the conventional reaction of partial oxidation necessitates the addition of steam to prevent deposition of carbon. When the catalyst of this invention is used, carbon is deposited in practically no amount (in absolutely no amount or in an extremely minute amount such as to have no effect on the catalyst) without the addition of steam. Thus, this invention does not need to add steam. Incidentally, the addition of steam brings an effect of increasing the ratio of formation of hydrogen during the reaction of partial oxidation. The addition of steam results in adding to the cost. In the case of this invention, since the addition of steam results in enhancing the ratio of formation of hydrogen, this effect of the enhanced ratio is well commensurate with the rise of cost due to the addition of steam. The addition of steam induces an exothermal reaction (the reaction of oxidation of hydrocarbon) and an endothermal reaction (the reaction of hydrocarbon and steam) and, therefore, represses the amount of heat generated as compared with the case of avoiding addition of steam.

For the purpose of effecting the reaction of catalytic partial oxidation while maintaining the temperature of the catalyst layer in the range mentioned above, a method which includes preheating the source gas and then introducing the preheated source gas into the catalyst layer and a method which includes simply heating the catalyst layer may be adopted.

When the method of preheating the source gas is adopted, it is proper to heat the source gas to a level generally in the range of 200 to 700° C. and preferably in the range of 300 to 600° C., though variable with kind of hydrocarbon, the composition of the source gas, and the reaction conditions. After the reaction in the catalyst layer has been initiated, the source gas is no longer required to be preheated because the heat of the reaction elevates the temperature of the catalyst layer and enables the reaction to acquire independence. It is naturally permissible to continue the preheating of the source gas as occasion demands, in due consideration of the heat balance of the entire reaction system.

When the method of simply heating the catalyst layer is adopted, the catalyst layer may be heated to a temperature in the range of 200 to 700° C. and preferably in the range of 300 to 600° C. prior to the introduction of the source gas and this heating of the catalyst layer may be stopped after the commencement of the reaction.

The reformed gas which is obtained by the method of reforming of this invention may be used in its unreformed form as the fuel for a fuel cell or as the raw material for a chemical industry. Among other various types of fuel cell, the molten carbonate fuel cell and the solid oxide fuel cell which are discriminated from the high-temperature operating type are capable of utilizing carbon monoxide and hydrocarbons as the fuel besides hydrogen. It is, therefore, advantageous to use in these types of fuel cell the catalyst of this invention and the hydrogen-containing gas obtained by the reaction using this catalyst.

Incidentally, the high-temperature operating type fuel cell is supposed in the light of the principle of operation to be capable of effecting the reforming of a hydrocarbon within the cell of its own owing to the catalytic action of the electrode (internal reforming). Since this reaction actually entails the problem of carbon deposition, depending on the kind of hydrocarbon and the impurity contained in the hydrocarbon, this fuel cell may possibly fail to attain internal reforming of the whole of hydrocarbon. The hydrocarbon, therefore, is required to be given a preliminary treatment before it is introduced into the fuel cell. This preliminary reforming may be advantageously effected by using the catalyst of this invention.

The hydrogen-containing gas which is obtained by the method of reforming of this invention is enabled to produce hydrogen gas of high purity when it is further subjected to a reaction of CO removal and allowed to lower the carbon monoxide concentration or subjected to a process for deep freeze separation, a PAS process, or a hydrogen storage alloy or a process for diffusion with or a palladium membrane to expel an impurity. For the purpose of decreasing carbon monoxide, for example, it suffices to subject the reformed gas in combination (or not in combination) with steam to a water-gas-shift reaction and consequently induce preferential oxidation of carbon monoxide into carbon dioxide gas. The catalyst to be used for the water-gas-shift reaction may be any of the known catalysts which are formed mainly of copper or mainly of iron, for example. The water-gas-shift reaction can lower the carbon monoxide concentration to the neighborhood of 1%. The carbon monoxide poisons the catalytic function of the electrode to be used in a low-temperature operation type polymer electrolyte fuel cell. For the purpose of preventing the catalyst from this poisoning, it is proper to keep the carbon monoxide concentration below 10 ppm. Incidentally, for the purpose of decreasing the carbon monoxide concentration below 10 ppm, it suffices to add a minute amount of oxygen to the gas resulting from the reaction of CO denaturation and consequently effect selective removal of carbon monoxide by oxidation.

EXAMPLES

Example 1

Carrier: A honeycomb carrier made of cordierite and containing 400 cells per the square of one inch of cross section (produced by NGK Insulators Ltd.) was cut to separate a carrier 25.4 mmφ in outside diameter and 77 mm in length (39.0 ml of carrier volume) for the preparation of the catalyst of this example.

Rhodium-platinum supported activated alumina: An aqueous rhodium nitrate solution containing 0.536 g of rhodium and an aqueous nitric acid solution of dinitrodiamine platinum containing 0.054 g of platinum were mixed. An activated alumina (150 g) having a specific surface area of 155 m$^2$/g was impregnated with the resultant solution and then dried at 150° C. overnight (15 hours). By calcinating the powder resulting from the drying in the air at 400° C. for two hours, an activated alumina having rhodium (Rh) and platinum (Pt) supported thereon at a ratio of 100:10 (mass ratio) was prepared.

Preparation of slurry: An aqueous slurry was prepared by supplying 100.00 g of the rhodium-platinum supported activated alumina, purified water, and acetic acid to a ball mill and wet milling them therein.

Production of catalyst: A catalyst (a) was obtained by immersing the aforementioned carrier in the slurry thereby inducing adhesion of the slurry to the carrier, removing the carrier from the slurry, then blowing the carrier with compressed air thereby inducing removal of the excess slurry remaining in the cells, then drying the carrier at 150° C. and consequently inducing adhesion of the catalytic component to the carrier, and thereafter calcinating the dried carrier in the air for one hour (500° C.) and consequently inducing support of 5.5 g of the catalyst component on the carrier.

Example 2

Rhodium-platinum supported activated alumina: A catalyst (b) was prepared by following the procedure of Example 1 while using an aqueous nitric acid solution of dinitrodiamine platinum containing 0.268 g of platinum. The ratio of rhodium (Rh) and platinum (Pt) was 100:50 (mass ratio) in the catalyst (b).

Example 3

Rhodium-platinum supported activated alumina: A catalyst (c) was prepared by following the procedure of Example 1 while using an aqueous nitric acid solution of dinitrodiamine platinum containing 0.536 g of platinum. The ratio of rhodium (Rh) and platinum (Pt) was 100:100 (mass ratio) in the catalyst (c).

Example 4

Rhodium-platinum supported activated alumina: A catalyst (d) was prepared by following the procedure of Example 1 while using an aqueous nitric acid solution of dinitrodiamine platinum containing 2.679 g of platinum. The ratio of rhodium (Rh) and platinum (Pt) was 20:100 (mass ratio) in the catalyst (d).

Example 5

Rhodium-platinum supported activated alumina: A catalyst (e) was prepared by following the procedure of Example 1 while using an aqueous nitric acid solution of dinitrodiamine platinum containing 5.357 g of platinum. The ratio of rhodium (Rh) and platinum (Pt) was 10:100 (mass ratio) in the catalyst (e).

Comparative Example 1

Rhodium supported activated alumina: An activated alumina having rhodium (Rh) alone supported thereon was prepared by following the procedure of Example 1 while using an aqueous rhodium nitrate solution containing 0.536 g of rhodium.

A catalyst (f) for comparison was prepared by following the procedure of Example 1 while using the rhodium supported activated alumina mentioned above.

Comparative Example 2

Platinum supported activated alumina: An activated alumina having platinum (Pt) alone supported thereon was prepared by following the procedure of Example 1 while using an aqueous nitric acid solution of dinitrodiamine platinum containing 1.607 g of platinum.

A catalyst (g) for comparison was prepared by following the procedure of Example 1 while using the aforementioned platinum supported activated alumina.

Comparative Example 3

Palladium supported activated alumina: An activated alumina having palladium (Pd) alone supported thereon was prepared by following the procedure of Example 1 while using an aqueous palladium nitrate solution containing 1.607 g of palladium.

A catalyst (h) for comparison was obtained by following the procedure of Example 1 while using the aforementioned palladium supported activated alumina.

Comparative Example 4

Palladium-platinum supported activated alumina: An activated alumina having palladium (Pd) and platinum (Pt) supported thereon in a ratio of 100:100 (mass ratio) was prepared by mixing an aqueous palladium nitrate solution containing 0.804 g of palladium and an aqueous nitric acid solution of dinitrodiamine platinum containing 0.804 g of platinum and processing the resultant solution by following the procedure of Example 1.

A catalyst (i) for comparison was obtained by following the procedure of Example 1 while using the aforementioned palladium-platinum supported activated alumina.

Example 6

Rhodium-platinum supported activated alumina: An aqueous rhodium nitrate solution containing 0.268 g of rhodium and an aqueous nitric acid solution of dinitrodiamine platinum containing 1.339 g of platinum were mixed. An activated alumina having rhodium (Rh) and platinum (Pt) supported thereon in a ratio of 20:100 (mass ratio) and in a total amount of 1.06 mass % was prepared by following the procedure of Example 1.

Preparation of slurry: An aqueous slurry was prepared by supplying 73.89 g of the aforementioned rhodium-platinum supported activated alumina, 26.11 g of cerium oxide having a specific surface area of 70 $m^2/g$, purified water and acetic acid to a ball mill and wet milling them therein.

Production of catalyst: A catalyst (j) was obtained by immersing the same carrier as used in Example 1 in the slurry thereby inducing adhesion of the slurry to the carrier, removing the carrier from the slurry, then blowing the carrier with compressed air thereby inducing removal of the excess slurry remaining in the cells, then drying the carrier at 150° C. and consequently inducing adhesion of the catalytic component to the carrier, thereafter calcinating the dried carrier in the air for one hour (500° C.) and consequently inducing firm support of the catalyst component on the carrier, immersing the carrier having the catalytic component supported thereon in the aforementioned slurry, and repeating the same procedure thereby inducing support of 7.5 g of the catalyst component on the carrier.

This catalyst (j) was found to have an EPMA process average particle diameter of 0.7 μm.

Example 7

Cerium-zirconium mixed oxide: A cerium-zirconium mixed oxide was prepared by calcinating a cerium carbonate powder at 400° C. for two hours and then pulverizing the calcinated cerium carbonate powder thereby obtaining a cerium oxide powder, adding the cerium oxide powder and an aqueous zirconium oxynitrate solution uniformly in such a ratio as to fix the mass ratio of cerium oxide:zirconium oxide at 100:20, drying the resultant mixed slurry at 120° C. thereby inducing removal of the moisture, and thereafter calcinating the dried mixed slurry in the air at 500° C. for one hour.

Preparation of slurry: An aqueous slurry was prepared by supplying 70.22 g of the same rhodium-platinum supported activated alumina as used in Example 6, 29.78 g of the aforementioned cerium-zirconium mixed oxide, purified water, and an acetic acid to a ball mill and wet milling them therein.

A catalyst (k) having 7.9 g of a catalyst component supported on the carrier was obtained by following the procedure of Example 6 while using the slurry mentioned above instead.

The catalyst (k) was found to have an EPMA process average particle diameter of 0.7 μm.

Example 8

Rhodium-platinum supported activated alumina: An activated alumina having rhodium (Rh) and platinum (Pt) supported thereon in a ratio of 20:100 (mass ratio) in a total amount of 11.11 mass % was prepared by mixing an aqueous rhodium nitrate solution containing 0.208 g of rhodium and an aqueous nitric acid solution of dinitrodiamine platinum containing 1.042 g of platinum, impregnating activated alumina (10 g) having a specific surface area of 155 $m^2/g$ with the solution, and following the procedure of Example 1.

Preparation of slurry: An aqueous slurry was prepared by supplying 6.70 g of the aforementioned rhodium-platinum supported activated alumina, 29.78 g of the aforementioned cerium-zirconium mixed oxide used in Example 7, 63.52 g of activated alumina having a specific surface area of 105 $m^2/g$, purified water, and acetic acid to a ball mill and wet milling them therein.

A catalyst (l) having 7.9 g of a catalyst component supported on the carrier was obtained by following the procedure of Example 2 while using the aforementioned slurry.

This catalyst (l) was found to have an EPMA process average particle diameter of 4 μm.

Example 9

The catalysts (a)-(e) and the catalyst for comparison (f) were subjected to the reaction of partial oxidation of a town gas 13A (containing 88 vol % of methane and 5 ppm of sulfur) as the source hydrocarbon and were compared in performance.

A given catalyst was packed in a reaction tube made of inconel and thermally insulated with a refractory material. A metal sheathed chromel-alumel (K) thermocouple (1 mm in outside diameter) was inserted into the catalyst layer to measure the catalyst layer temperature. Air was used as the oxygen-containing gas and a mixed gas so prepared as to have an oxygen molecule/carbon ratio of 0.54/1 was used as the reaction gas.

The reaction gas was preheated to 400° C. and supplied at a space velocity (STP) of 14,000 $h^{-1}$ to the catalyst layer to initiate the reaction. After the start of the reaction, the preheating of the reaction gas was stopped and the reaction gas at normal room temperature was supplied to the catalyst layer. In five hours of starting the reaction, the highest catalyst layer temperature was measured.

Referential Example

The catalyst (f) for comparison was subjected to the same reaction as in Example 9 using the town gas 13A in a desulfurized form as the source hydrocarbon. As the desulfurizer, TOSPIX™ 94 (made by Tokyo Gas Co. Ltd.) was used.

Figure 1:
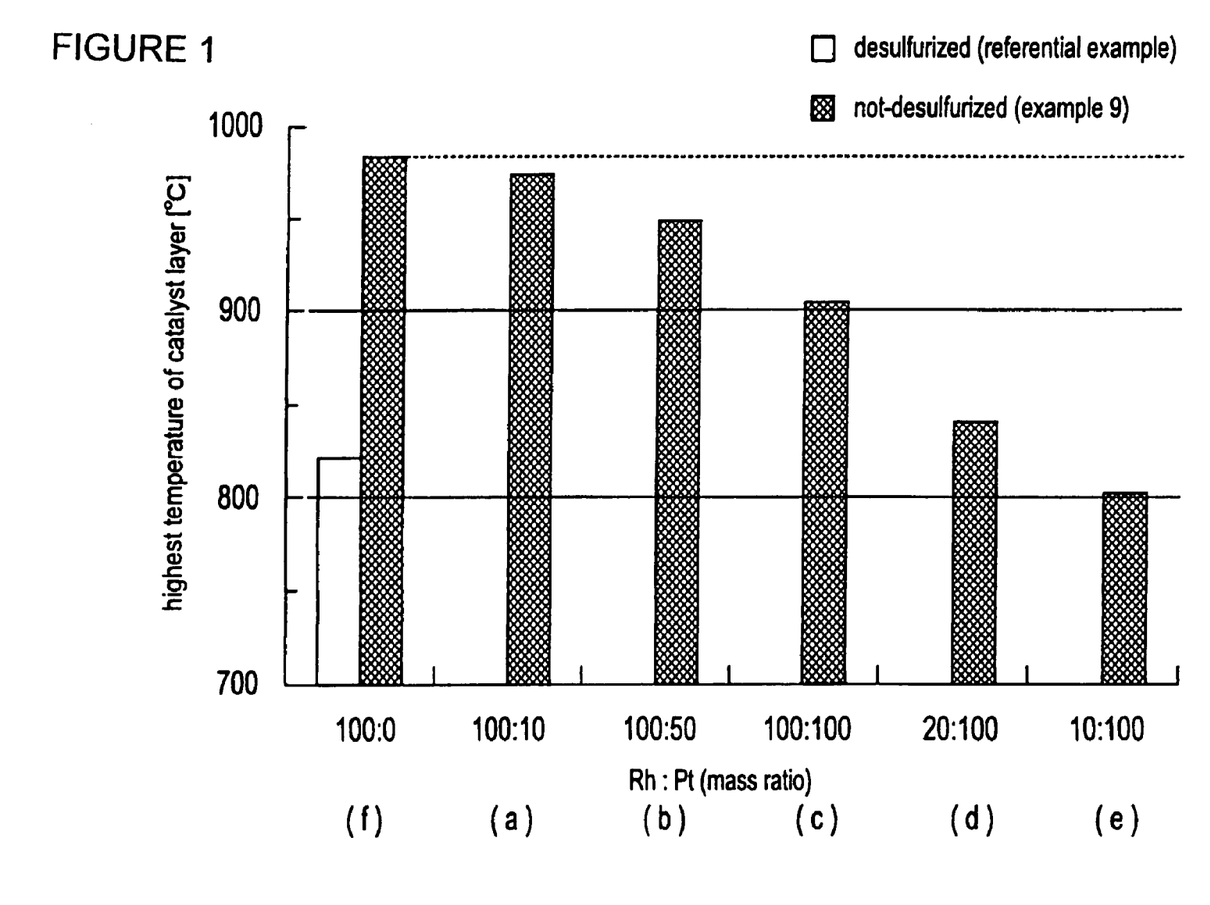
FIG. 1 is a diagram showing the results of Example 9 and Referential Example.

The test results of Example 9 and Referential Example were as shown in FIG. 1.

The catalyst (f) for comparison contained rhodium alone. The highest temperature of the catalyst layer was 820° C. when the town gas 13A in a desulfurized state was used as raw material. When the town gas 13A not desulfurized and containing a sulfur compound was used as the raw material, however, the highest temperature of the catalyst layer was raised to 982° C. owing to the influence of sulfur. The catalysts (a)-(e) having platinum added to rhodium were found to have the rise of the highest catalyst layer temperature repressed as compared with the catalyst (f) for comparison. Since the degradation of activity by aging in the reaction of partial oxidation is ascribable predominantly to the deterioration by the thermal load, it is suggested that the catalysts (a)-(e) possess higher durability than the catalyst (f) for comparison.

Example 10

The catalysts (a), (d), (j), (k), (l) and the catalysts (f)-(i) for comparison were subjected to the following accelerated durability test and were rated for durability.

A given catalyst was cut into rectangular pieces 7×7×10 mm. A reaction tube made of inconel and insulated with a refractory material was packed with the rectangular pieces. A metal sheathed chromel-alumel (K) thermocouple (1 mm in outside diameter) was inserted into the catalyst layer to measure the catalyst layer temperature. The town gas 13A in an undesulfurized state was used as the hydrocarbon source gas. Air was used as the oxygen-containing gas and a mixed gas so prepared as to have an oxygen molecule/carbon ratio of 0.52/1 was used as the reaction gas.

The reaction gas was preheated to 400° C. and supplied at a space velocity (SV) of 150,000 $H^{-1}$ to the catalyst layer to initiate the reaction. After the start of the reaction, the reaction gas was preheated at 250° C. and supplied at a space velocity (STP) of 370,000 $h^{-1}$ to carry out the reaction of partial oxidation.

The gas consequently formed was analyzed by gas chromatography using a unit (Gas Chromatograph GC-8A" made by SHIMADZU CORPORATION) to determine the conversion of the raw material during the initial state of the reaction (in three hours of starting the reaction) and after the elapse of 100 hours.

Conversion of raw material (%)=(CO+$CO_2$)/(CO+$CO_2$+$CH_4$)(×100)

In the formula, CO, $CO_2$, and $CH_4$ respectively denote the concentrations of carabon monoxide, carbon dioxide, and methane at the outlet of the reaction tube.

The test results obtained of the catalyst (f) for comparison and the catalysts (a), (d), (j), (k), and (l) are shown in Table 1.

TABLE 1

| Catalyst | Conversion of raw material during initial stage (%) (Highest temperature of catalyst layer (° C.) | Conversion of raw material after elapse of 100 hours (Highest temperature of catalyst layer (° C.) |
|---|---|---|
| Catalyst (f) Rh:Pt = 100:0 | 61 (1020) | 40 (1068) |
| Catalyst (a) Rh:Pt = 100:10 | 61 (1014) | 43 (1056) |
| Catalyst (d) Rh:Pt = 20:100 | 63 (924) | 51 (982) |
| Catalyst (j) Rh:Pt = 20:100 | 64 (919) | 55 (971) |
| Catalyst (k) Rh:Pt = 20:100 | 65 (915) | 57 (960) |
| Catalyst (l) Rh:Pt = 20:100 | 68 (911) | 64 (955) |

It is noted that the catalysts (a) and (d) having platinum added to rhodium showed lower highest temperatures of catalyst layer, repressed degradations of the degrees of conversion of raw material by aging, and higher durability of catalyst than the catalyst (f) for comparison having rhodium alone supported thereon.

In the reaction with the catalyst (g) for comparison having platinum alone supported thereon, while the conversion of the raw material was 60% and the highest temperature of the catalyst layer was 955° C. during the initial stage of the reaction, the highest temperature of the catalyst layer showed an inclination of abruptly rising within a short span of time to reach 1057° C. after the elapse of 20 hours and thereafter gradually falling. Since the conversion of the raw material fell to a level of not more than 35% after the elapse of 30 hours, the reaction was terminated. This fact clearly shows that the catalyst having platinum alone supported thereon was markedly deficient in durability.

The reaction with the catalyst (h) for comparison having palladium alone supported thereon was terminated during the initial stage thereof because the temperature of the catalyst layer did not stabilize but showed a phenomenon of fluctuating during the initial stage. This fact clearly indicates that the catalyst having palladium alone supported thereon is not suitable for the reaction of partial oxidation of a hydrocarbon.

In the reaction with the catalyst (i) for comparison which had palladium and platinum supported at a mass ratio of 100:100 thereon, though the conversion of the raw material was 60% and the highest temperature of the catalyst layer was 948° C. during the initial stage of the reaction, the highest temperature of the catalyst layer showed an inclination of abruptly rising and then gradually falling with fluctuation similarly to the catalyst (h) for comparison. Since the conversion of the raw material fell to a level of not more than 35% after the elapse of 30 hours, the reaction was terminated. This fact clearly indicates that the catalyst having palladium and platinum supported thereon war markedly deficient in durability.

The catalyst (j) having cerium oxide incorporated in the catalyst component is noted to have a low highest temperature of the catalyst layer, a repressed degradation of the conversion of the raw material by aging, and a markedly improved durability in spite of the ½ content of the platinum group element, as compared with the catalyst (d) having no addition of cerium oxide.

It is noted that the catalyst (k) using a cerium-zirconium mixed oxide in the place of cerium oxide possessed higher durability than the catalyst (j) using cerium oxide.

It is also noted that the catalyst (l) having a platinum group element supported at a high ratio on an activated alumina and having a high average particle diameter of the activated alumina on which the platinum group element was supported had still higher durability than the catalyst (k).

Example 11

The catalyst (l) was subjected to the accelerated durability test and rated for durability by following the procedure of Example 10 while having the aforementioned mixed gas reformed into a mixed gas having additionally incorporating steam therein in such an amount as to set the water molecule/carbon ratio at ⅓.

TABLE 2

| Catalyst | Conversion of raw material during initial stage of reaction (%) (Highest temperature of catalyst layer (° C.) | Conversion of raw material after the elapse of 100 hours (Highest temperature of catalyst layer (° C.) |
|---|---|---|
| Catalyst (l) Rh:Pt = 20:100 | 71 (892) | 68 (938) |

From the foregoing results, it is noted that the catalyst possessed high durability even in the reaction involving addition of steam.

The entire disclosure of Japanese Patent Application No. 2003-369019 filed on Oct. 29, 2003 including specification, claims, drawings and summary are incorporated herein by reference in its entirety.

The invention claimed is:

1. A reforming catalyst for partial oxidation to reform hydrocarbon compound including a sulfur-containing compound, comprising:
    platinum;
    rhodium;
    at least one cerium-containing oxide selected from the group consisting of a cerium oxide and a cerium-zirconium mixed oxide;
    a refractory inorganic oxide having the platinum and the rhodium disposed on a surface thereof, an average particle diameter of the refractory inorganic oxide being in the range of 1 to 20 μm; and
    a monolith carrier on a surface of which the at least one cerium-containing oxide and the refractory inorganic oxide are disposed;
wherein the total amount of the platinum and rhodium to be disposed is in the range of 3 to 30% based on the mass of the refractory inorganic oxide.

2. A reforming catalyst for partial oxidation according to claim 1, wherein the mass ratio of the platinum to the rhodium (platinum: rhodium) is in the range of 5:100 to 100:10.

3. A reforming catalyst according to claim 2, wherein platinum and rhodium are disposed on a part of the surface of the refractory inorganic oxide.

4. A reforming catalyst according to claim 3, wherein the refractory inorganic oxide is activated alumina.

5. A reforming catalyst according to claim 2, wherein platinum and rhodium are disposed on the entire surface of the refractory inorganic oxide.

6. A reforming catalyst according to claim 5, wherein the refractory inorganic oxide is activated alumina.

7. A reforming catalyst according to claim 1, wherein platinum and rhodium are disposed on a part of the surface of the refractory inorganic oxide.

8. A reforming catalyst according to claim 7, wherein the refractory inorganic oxide is activated alumina.

9. A reforming catalyst according to claim 1, wherein platinum and rhodium are disposed on the entire surface of the refractory inorganic oxide.

10. A reforming catalyst according to claim 9, wherein the refractory inorganic oxide is activated alumina.

11. A method for the reforming of a hydrocarbon compound including sulfur-containing compound, comprising:
    exposing the reforming catalyst for partial oxidation of claim 1 to a mixed gas comprising a hydrocarbon compound containing a sulfur-containing compound and oxygen or an oxygen-containing gas thereby reforming the hydrocarbon compound by partial oxidation.

12. A method for the reforming according to claim 11, wherein the mixed gas contains steam.

* * * * *